United States Patent Office 2,746,873
Patented May 22, 1956

2,746,873

STAIN FILLER COMBINATION FOR WOOD

John W. Mayers, Grosse Ile, Mich., assignor to Chadeloid Corporation, Dayton, Ohio, a corporation of Delaware No Drawing. Original application July 21, 1949, Serial No. 106,093, now Patent No. 2,632,710, dated March 24, 1953. Divided and this application October 14, 1952, Serial No. 314,749

4 Claims. (Cl. 106—34)

This application deals with a method of finishing wood, and in particular with the method of staining and filling wood, and with a composition therefor.

Still more particularly it deals with a combination stain and filler of the mahogany type.

This application is a division of my co-pending application, Serial No. 106,093, filed July 21, 1949, now U. S. Patent No. 2,632,710.

The methods customarily used heretofore for finishing wood surfaces comprised the following steps: (a) the wood article is sanded and then brushed or blown free of any dust or wood particles so as to produce a smooth surface; (b) the color of the wood is brought to a uniform hue or at least to a state of equal depth of color by "sap staining" the lighter colored parts or sections; (c) the articles are then stained to the color desired; (d) in the case of water stains used in step (c), the grain of the wood will have been roughened and must be leveled by applying a wash coat of shellac and then lightly sanding; (e) a glaze or sealer coat is applied in order to seal the surface of the wood whereby penetration and thus coloring of the wood by the succeeding filler coat is prevented; (f) the filler coat is applied, allowed to set, and the excess thereof is then wiped off so that merely the pores finally contain material of the filler coat; and (g) transparent sealer and lacquer or varnish coats are applied in order to give the wood surface a good protection and a pleasant appearance.

Combination stain-filler materials have been used heretofore in order to avoid the many process steps required in the above described traditional finishing method. However, these previous combination methods are based on the use of oil-soluble organic dyes, the compositions are rather unstable to light and tend to blend into succeeding finishing coats. They also dry very slowly. Frequently, the materials are not sufficiently bound in the pores of the wood so that a subsequent coating lifts these materials from the pores and to the surface which considerably impairs the appearance of the finished article. Furthermore, the pigment of such compositions is absorbed to some extent by the entire wood surface instead of only by the pores. This again accounts for poor showing of the structure of the wood. These oil soluble dyes, in addition, have limited solubility in mediums which aid in the penetration of the wood pores.

It is an object of this invention to provide a wood finish by which all the disadvantages enumerated above are overcome.

It is an object of this invention to provide a surface coating for wood which is characterized by a high degree of color stability.

It is another object of this invention to provide a surface coating for wood which is characterized by high brilliance.

It is another object of this invention to provide a surface coating for wood which is free of oils and based upon vehicles having a penetrating effect on the pores of the wood.

It is another object of this invention to provide a surface coating for wood which may be applied in a single step.

It is another object of this invention to provide a surface coating for wood which shows an excellent sealing action against lacquers and varnishes subsequently applied thereto.

It is still another object of this invention to provide a pore filler for wood which is not lifted by succeeding finishing coats.

It is still another object of this invention to provide a stain and filler of the mahogany type which deposits in the pores of the wood an inert dark pigment which wipes clear of the surface of the wood and leaves a brilliant finish.

These and other objects are accomplished by mixing together a resinous binder soluble in compounds bearing hydroxyl groups and in hydrocarbon distillates, inert pore filler material with or without a dispersing agent therefor, activated charcoal together with other inert pigments for coloring the pores of wood, dye stuffs soluble in compounds bearing a hydroxyl radical and a solvent vehicle made up of single solvents having dissolving power for both the resinous binder and the dye-stuffs, or mixtures of compatible solvents which are capable of forming a homogeneous mixture with the resinous binder and the dyestuffs, and then applying the mixture to the surface of the wood.

The brilliant stains and fillers of this invention utilize as a basic ingredient activated charcoal. This material is prepared by subjecting dense charcoal to the action of steam at very high pressure.

Mahogany finishes utilizing activated charcoal are immediately recognizable, because the activated charcoal composition wipes to a clear brilliant finish, with the charcoal deposited in the pores of the wood.

In order to maintain the above characteristics, it is necessary that the activated charcoal be present in very definite quantities. If too great a quantity of charcoal is present, the stain turns muddy in appearance. Quantities of activated charcoal up to about 18% may be used depending upon the depth of color of the stain, but it is preferable for most purposes to utilize quantities in the range of 4 to 10% by weight of the solids.

In previous mahogany finishes prepared using carbon black, the composition upon wiping tended to leave a minute layer over the entire surface sufficient to impart a muddy off-color appearance.

Other pigments which are useful in these compositions for their darkening effect, mainly on the pores of wood, are black, red, and orange iron oxides, black dyestuffs, and organic lakes.

As resinous binders applicant has successfully utilized natural gums, synthetic resins, and the like, which are soluble in solvents having as part of their structure an hydroxyl group. Thus, for example, applicant can use natural resins, such as manila gum, and synthetic resins, such as phenol formaldehyde resin, glycol phthalate resins, and numerous alkyd type resins.

As for filler materials, applicant utilizes those common to the paint and varnish industry, for example, silex, barytes, expanded silica, asbestine, calcium carbonate, wood flour, starch, corn meal, and the like.

If it is desired to cut down the time of mixing, these fillers may be advantageously suspended by means of surface active agents, such as polymerized organic salt of sulfonic acid of the alkyl aryl type, or morpholine and salts of alkyl sulfates, all of which are common articles of commerce.

One of the distinctive characteristics of applicant's composition is that of its use of acid organic dyestuffs. These dyestuffs are not compatible with oil vehicles and therefore are useless in, for example, linseed oil and varnish base compositions.

In applicant's composition, however, all acid organic dyestuffs are operative for the process and the product created thereby. Thus, for example, the following black dyestuffs were found advantageous: Buffalo Black NBR Conc. 126%, Black Stain B34951, Nigrosine 4523J Conc. Powder; the following yellow dyestuffs: Fast Woold Yellow 3GL Conc. 125%, Fast Light Yellow 3G Ex. Conc., Fast Light Yellow D3GA; the following orange-yellow dyestuffs: Metanil Yellow 1955, Calcocid Yellow MXXX Conc.; the following orange dyestuffs: Fast Light Orange 2G, Fast Light Orange GA Conc.; the following red dyestuffs: Azo Rubine Ex. Conc. 133%, Calcocid Milling Red 7B Conc., Camoisine BA Extra Conc. CF, Chromolan Bordeaux R, Croceine Scarlet MOO.

As mentioned before, the solvent has to be chosen very carefully as this is one of the most essential factors on which the operativeness of the invention depends. The solvent vehicle must have good dissolving power for the dye ingredients and for the resinous ingredients.

The difficulty of finding a proper solvent which would be compatible in a filler-stain composition with the use of acid organic dyestuffs has limited the utility of this type coloring matter in filler-stain mixtures prepared heretofore.

We have now found that tetrahydrofurfuryl alcohol has the desired properties of dissolving acid organic dyes, has high penetrating efficiency in wood, is compatible with some of the less expensive resin solvents and has some dissolving power for resins.

Additional solvents approaching tetrahydrofurfuryl alcohol in dye solvency and effectiveness of penetration, are the hydroxyl bearing compounds, for example, the ether-alcohols such as diethylene glycol monoethyl ether, and ethylene glycol monoethyl ether.

Less effective dye solvents characterized by the hydroxyl group and having compatibility with resin solvents therefor being useful for this invention, are the amino alkyl alcohols, for example, methyl amino propanol, hydroxyl alicyclic compounds, such as cyclohexanol and heterocyclic ring alcohols, such as tetrahydrofurfuryl alcohol.

In order to increase the rapidity of drying of the solvent vehicles, some low boiling compounds compatible with both the dye and resin solvents, may be utilized as diluents. Illustrative compounds of this nature are the aliphatic alcohols, such as methyl and ethyl alcohol, and the like, esters of the aliphatic alcohols, such as ethyl acetate, ethyl propionate, amyl acetate, and the like, and ketones, such as acetone and cyclohexanone.

We have also found that certain ingredients which give the composition resistance to moisture retention are useful as solvents for resins and are compatible with the tetrahydrofurfuryl alcohol alone or when tetrahydrofurfuryl alcohol is mixed with other hydroxyl bearing compounds of lower solvency but higher volatility. These ingredients include hydrocarbon distillates, particularly toluol, xylols, ethyl benzene and solvent naphtha.

Certain of the esters, such as butyl and amyl acetate, butyl propionate, are also useful for this purpose. These hydrocarbon distillates are also compatible with certain of the lower boiling alcohols, such as methyl, propyl and butyl alcohol, which are often added to these mixtures as diluents which aid in the penetration and the evaporation of liquid constituents of the stain and filler composition.

If desired, plasticizers may be added to the mixture. Tricresyl phosphate is one of the many compounds suitable for this purpose. In the following examples, a few embodiments of the invention are illustrated:

*Example I*

A solution of Amberol 801 may be prepared by mixing the following ingredients:

| | Parts by weight |
|---|---|
| Amberol 801 (rosin-modified polymer of maleic anhydride and a polyhydric alcohol) | 50 |
| Xylol | 25 |
| Toluol | 25 |
| Tetrahydrofurfuryl alcohol | 50 |

In a separate batch the following dye solution may be prepared:

| | Parts by weight |
|---|---|
| Buffalo Black | 0.5 |
| Croceine Scarlet MOO | 2.8 |
| Metaline Yellow | 1.7 |
| Tetrahydrofurfuryl alcohol | 50.0 |

The dye solution is then mixed into the Amberol solution. Thereafter the following ingredients may be added:

| | Parts by weight |
|---|---|
| Calcium carbonate | 300 |
| Wood flour | 8 |
| Polymerized organic salt of sulfonic acid of the alkyl aryl type e. g., alkyl aryl sulfonates (surface active agent) | 4 |
| Activated charcoal | 12 |

The mixture may then be milled in a ball mill for 8 hours or passed through a 5-roll mill once.

Thereafter a thinner mixture composed of the following ingredients may then be added:

| | Parts by weight |
|---|---|
| Methanol | 75 |
| Toluol or "crude light solvent" | 250 |
| Ethylene glycol monomethyl ether | 40 |

The composition of this example will yield a mahogany type finish.

*Example II*

Another example for a mahogany type coating composition is given in the following:

| | Parts by weight |
|---|---|
| Gum accroides red | 40.0 |
| Tetrahydrofurfuryl alcohol | 8.0 |
| Dye solution (see below) | 4.0 |
| Calcium carbonate | 30.0 |
| Wood flour | 3.0 |
| Burnt umber | 1.0 |
| Toluol | 15.0 |
| Methanol | 5.0 |

The dye solution used may be composed of the following:

| | Parts by weight |
|---|---|
| Buffalo Black | 0.5 |
| Brilliant Croceine 3 BA | 2.8 |
| Metaline Yellow | 1.7 |
| Tetrahydrofurfuryl alcohol | 50.0 |

To one portion of the above composition may be added 2 parts by weight of activated charcoal. To another portion of the above composition may be added 1 part by weight of carbon black.

The materials may be milled for identical periods, for example, 6 hours in a ball mill.

Comparison of these two mahogany type stain and filler compositions shows that upon wiping surfaces with the composition containing activated charcoal, the same wipes relatively clean, leaving evidence of charcoal almost exclusively in the wood pores. On the other hand, a study of the surface of the wood coated with the composition containing carbon black shows evidence of carbon black scattered over the entire surface of the wiped wood, and the composition remaining on the surface of the wood has a brownish muddy cast.

Example III

| | Parts by weight |
|---|---|
| Gum manila | 4.0 |
| Diethylene glycol monoethyl ether | 8.0 |
| Dye solution of Example II | 4.0 |
| Calcium carbonate | 30.0 |
| Wood flour | 4.0 |
| Burnt umber | 2.0 |
| Activated charcoal | 4.0 |
| Methanol | 13.0 |
| Toluol | 33.0 |

This material is a heavy viscous liquid which should be milled as with Example II. A proper thinner to reduce to spraying consistency is:

| | Parts by weight |
|---|---|
| Methanol | 5.0 |
| Toluol | 12.0 |

It will be understood that the color of the compositions of the examples may be changed at will by merely altering the dyestuffs used.

The stain-fillers described are intended for spray application, but they also may be applied by brushing or dipping or any other means known to the art. In all cases, wiping after an initial partial drying of approximately 5 to 15 minutes is necessary in order to remove any excess of the composition.

The coated articles are then dried in air or in a drying device, to a state of complete dryness. This drying is effected to a temperature in the range of 100° F. to 200° F., preferably at about 120° F., so that liberation of moisture by the wood through its coating is prevented.

It will also be understood that while there have been described herein certain specific embodiments of the invention, it is not intended thereby to have the invention limited to or circumscribed by the details given herein in view of the fact that the invention is susceptible to various modifications and changes which come within the spirit of the disclosure and the scope of the appended claims.

I claim:

1. A wood staining and filling composition consisting essentially of the following ingredients in substantially the proportions given:

| | Parts by weight |
|---|---|
| Gum accroides red | 4.0 |
| Tetrahydrofurfuryl alcohol | 8.0 |
| Calcium carbonate | 30.0 |
| Wood flour | 3.0 |
| Burnt umber | 1.0 |
| Toluol | 15.0 |
| Methanol | 5.0 |
| Activated charcoal | 2.0 |
| Carbon black | 1.0 | and 4 parts by weight of dye solution consisting essentially of:

| | Parts by weight |
|---|---|
| Buffalo Black | 0.5 |
| Brilliant Croceine 3 BA | 2.8 |
| Metaline Yellow | 1.7 |
| Tetrahydrofurfuryl alcohol | 50.0 |

2. In a method of coating and filling wood, the step of applying a combination strain and filler mixture whose basic liquid component is characterized by the presence of an hydroxyl group consisting essentially of:

| | Parts by weight |
|---|---|
| Gum accroides red | 4.0 |
| Tetrahydrofurfuryl alcohol | 8.0 |
| Calcium carbonate | 30.0 |
| Wood flour | 3.0 |
| Burnt umber | 1.0 |
| Toluol | 15.0 |
| Methanol | 5.0 |
| Activated charcoal | 4.0 | and 4 parts by weight of dye solution consisting essentially of:

| | Parts by weight |
|---|---|
| Buffalo Black | 0.5 |
| Brilliant Croceine 3 BA | 2.8 |
| Metaline Yellow | 1.7 |
| Tetrahydrofurfuryl alcohol | 50.0 |

3. A wood staining and filling composition consisting essentially of the following ingredients, by weight:

| | Parts |
|---|---|
| Rosin modified polymer of maleic anhydride and polyhydric alcohol | 50 |
| Xylol | 25 |
| Toluol | 25 |
| Tetrahydrofurfuryl alcohol | 50 | and a dye solution consisting of

| | |
|---|---|
| Buffalo Black | 0.5 |
| Croceine Scarlet MOO | 2.8 |
| Metaline Yellow | 1.7 |
| Tetrahydrofurfuryl alcohol | 50 | and a filler consisting of

| | |
|---|---|
| Calcium carbonate | 300 |
| Wood flour | 8 |
| Polymerized organic alkyl aryl salt of sulfonic acid | 4 |
| Activated charcoal | 12 |

4. A wood staining and filling composition consisting of a resin selected from the group consisting of rosin-modified polymer of maleic anhydride and a polyhydric alcohol, and gum accroides red, said resin being dissolved in tetrahydrofurfuryl alcohol and a filler comprising wood flour and calcium carbonate, and a dye solution consisting of 0.5 parts by weight of Buffalo Black, 2.8 parts by weight of Croceine dye, 1.7 parts by weight Metaline Yellow, and 50.0 parts by weight tetrahydrofurfuryl alcohol.

References Cited in the file of this patent

UNITED STATES PATENTS

| 2,000,120 | Bush | May 7, 1935 |
| 2,565,602 | Fisher | Aug. 28, 1951 |
| 2,632,710 | Mayers | Mar. 24, 1953 |